United States Patent [19]

Yale et al.

[11] 4,036,654

[45] July 19, 1977

[54] ALKALI-RESISTANT GLASS COMPOSITIONS

[75] Inventors: Brian Yale, Ormskirk; Anup Sircar, Sheffield, both of England

[73] Assignee: Pilkington Brothers Limited, St. Helens, England

[21] Appl. No.: 669,002

[22] Filed: Mar. 22, 1976

Related U.S. Application Data

[63] Continuation-in-part of Ser. No. 426,142, Dec. 19, 1973, abandoned.

[30] Foreign Application Priority Data

Dec. 19, 1972  United Kingdom .............. 58613/72

[51] Int. Cl.$^2$ .................. C03C 3/04; C03C 13/00; C04B 31/06
[52] U.S. Cl. .................................... 106/52; 106/99; 106/50
[58] Field of Search .................... 106/99, 52, 50

[56] References Cited

U.S. PATENT DOCUMENTS

| | | | |
|---|---|---|---|
| 3,060,041 | 10/1962 | Loewenstein | 106/50 |
| 3,783,092 | 1/1974 | Majumdar | 106/52 |
| 3,904,423 | 9/1975 | Guthrie | 106/50 |

FOREIGN PATENT DOCUMENTS

| | | | |
|---|---|---|---|
| 1,191,162 | 5/1970 | United Kingdom | 106/52 |
| 259,337 | 4/1970 | U.S.S.R. | 106/52 |

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

Glass compositions with a particularly high alkali resistance comprise, in weight percentages:

| | |
|---|---|
| $SiO_2$ | 45 to 65% |
| $ZrO_2$ | 6 to 20% |
| RO | 20 to 45% | the total of $SiO_2 + ZrO_2 + RO$ being not less than 94% by weight of the glass, where RO represents CaO, in an amount from 20 to 45%, with or without lesser amounts of further divalent oxides of the group consisting of MgO, SrO, BaO and ZnO, the balance (if any) of the composition consisting of compatible constituents such as $TiO_2$, $Al_2O_3$, $B_2O_3$, $Fe_2O_3$, $F_2$ and $R_2O$, where $R_2O$ represents $K_2O$, $Na_2O$ or $Li_2O$, the amount of any one of these compatible constituents not exceeding 5% by weight. Preferably $R_2O$ does not exceed 3%.

5 Claims, No Drawings

ALKALI-RESISTANT GLASS COMPOSITIONS

CROSS-REFERENCE TO RELATED APPLICATION

This application is a continuation-in-part of application Ser. No. 426,142 filed Dec. 19, 1973 (now abandoned).

BACKGROUND OF THE INVENTION

1. Field of the Invention

This invention relates to alkali-resistant glass compositions and particularly, though not exclusively, to such compositions which can be formed into glass fibres.

2. Description of the Prior Art

It is known to include a proportion of zirconia ($ZrO_2$) in glass compositions for enhancing their resistance to alkalis. It is also known that the inclusion of substantial proportions of boron oxide ($B_2O_3$) and/or alkali metal oxides ($R_2O$) has a deleterious effect on the alkali resistance of the glass, although both these constituents have other favourable properties which have hitherto been considered to make their inclusion desirable. For example, both $B_2O_3$ and $R_2O$ act as fluxes to aid melting and thus help to overcome the tendency of $ZrO_2$ to make melting difficult, and they can also improve the characteristics of the glass for drawing glass fibres.

SUMMARY OF THE INVENTION

It is an object of the present invention to provide glass compositions with a particularly high alkali resistance.

According to the present invention, the major components of the glass composition comprise, in weight percentages:-

| | |
|---|---|
| $SiO_2$ | 45 to 65% |
| $ZrO_2$ | 6 to 20% |
| RO | 20 to 45% | the total of $SiO_2$ + $ZrO_2$ + RO being not less than 94% by weight of the glass, where RO represents at least one divalent oxide of the group consisting of CaO, MgO, SrO, BaO and ZnO, the amount of said divalent oxide or oxides lying within the ranges, in weight percentages: CaO 20 to 45%; MgO 0 to 10%; SrO 0 to 8%; BaO 0 to 10% and ZnO 0 to 5%.

The balance of the composition may consist of at least one of the following constituents: $TiO_2$, $Al_2O_3$, $B_2O_3$, $Fe_2O_3$, $F_2$ and $R_2O$, where $R_2O$ represents $K_2O$ $Na_2O$, or $Li_2O$, the amount of any one of the said constituents not exceeding 5% by weight of the composition. Preferably the amount of $R_2O$ does not exceed 3% by weight of the composition.

The glass compositions according to the invention thus contain relatively large proportions of $ZrO_2$, while being free from, or containing only low proportions of, $B_2O_3$ and $R_2O$. In spite of the absence or low level of these fluxing agents, it has proved possible to melt the glass compositions quite readily.

When subjected to standard tests for chemical durability in aqueous and in alkaline environments, such glass compositions have shown excellent results. It has also proved possible to form them into glass wool fibres, e.g. by high temperature blown type processes.

DETAILED DESCRIPTION OF THE INVENTION

Specific embodiments of glass compositions in accordance with the invention will now be described by way of example.

The following Table 1 lists 18 glass compositions consisting of $ZrO_2$, $SiO_2$ and CaO, illustrating the use of four different values for $ZrO_2$ (18, 14, 10 and 8 weight %) with varying proportions of $SiO_2$ between 45 and 65 weight % and correspondingly inversely varying proportions of CaO between 45 and 21 weight %.

TABLE 1

| wt.% $ZrO_2$ | wt.% $SiO_2$ | wt.% CaO |
|---|---|---|
| 18 | 45 | 37 |
| 18 | 50 | 32 |
| 18 | 55 | 27 |
| 18 | 60 | 22 |
| 14 | 45 | 41 |
| 14 | 50 | 36 |
| 14 | 55 | 31 |
| 14 | 60 | 26 |
| 14 | 65 | 21 |
| 10 | 45 | 45 |
| 10 | 50 | 40 |
| 10 | 55 | 35 |
| 10 | 60 | 30 |
| 10 | 65 | 25 |
| 8 | 48 | 44 |
| 8 | 50 | 42 |
| 8 | 55 | 37 |
| 8 | 60 | 32 |

Table 2 lists 24 further glass compositions, each of which is identified by a number C/07 followed by a three-figure number. For most of the glasses in Table 2, the composition is given both in mole percentages and in weight percentages and the liquidus temperature and the results of standard chemical durability tests are given. In the latter tests, 10 gm samples of the glass are ground to a powder and treated with 50 c.c. of the specified reagent (water, N/10 NaOH and N.NaOH respectively). The weights of the component oxides extracted (in milligrams) are listed in Table 2.

TABLE 2

| Glass No. C/07 | 157 Mol | 157 Wt.% | 158 Mol | 158 Wt.% | 159 Mol | 159 Wt.% | 163 Mol | 163 Wt.% |
|---|---|---|---|---|---|---|---|---|
| $SiO_2$ | 54 | 51.55 | 58 | 55.2 | 55 | 53.6 | 50 | 47.9 |
| $ZrO_2$ | 7 | 13.7 | 7 | 13.7 | 5 | 10.0 | 7 | 13.7 |
| CaO | 39 | 34.75 | 35 | 31.1 | 40 | 36.4 | 43 | 38.4 |
| MgO | | | | | | | | |
| SrO | | | | | | | | |
| BaO | | | | | | | | |
| $TiO_2$ | | | | | | | | |
| $Na_2O$ | | | | | | | | |
| ZnO | | | | | | | | |
| Liquidus Temperature $T_L$ °C | 1405 | | 1420 | | 1450 | | 1450 | |
| Chemical Durability | | | | | | | | |
| Reagent — Oxide extracted | | | | | | | | |
| $Na_2O$ | | | | | | | | |

TABLE 2-continued

|  |  |  |  |  |  |
|---|---|---|---|---|---|
| $H_2O$ | $SiO_2$ | 1.0 | 1.0 | 0.6 | 1.2 |
|  | CaO | 0.63 | 0.65 | 1.1 | 0.73 |
| N/10 | $SiO_2$ | 0.6 | 0.8 | 1.6 | 1.05 |
| NaOH | CaO | 0.26 | 0.26 | 0.24 | 0.31 |
| N | $SiO_2$ | 1.4 | 1.25 | 1.2 | 1.25 |
| NaOH | CaO | 0.59 | 0.74 | 0.81 | 0.75 |

| Glass No.C/07 | | 171 | | 174 | | 178 | |
|---|---|---|---|---|---|---|---|
|  |  | Mol | Wt% | Mol | Wt.% | Mol | Wt.% |
|  | $SiO_2$ | 60 | 57.44 | 54 | 52.2 | 58 | 55.9 |
|  | $ZrO_2$ | 7 | 13.74 | 7 | 13.9 | 7 | 13.8 |
|  | CaO | 29 | 25.91 | 34 | 30.7 | 30 | 27.0 |
|  | MgO | 3 | 1.92 | 5 | 3.2 | 5 | 3.2 |
|  | SrO |  |  |  |  |  |  |
|  | BaO |  |  |  |  |  |  |
|  | $TiO_2$ |  |  |  |  |  |  |
|  | $Na_2O$ | 1 | 0.99 |  |  |  |  |
|  | ZnO |  |  |  |  |  |  |
| Liquidus Temperature $T_L$ °C | | 1420 | | 1415 | | 1410 | |
| Chemical Durability | | | | | | | |
| Reagent | Oxide extracted | | | | | | |
|  | $Na_2O$ |  | 0.22 |  |  |  |  |
|  | $SiO_2$ |  | 0.6 |  | 0.4 |  | 0.3 |
| $H_2O$ | CaO |  | 0.41 |  | 0.47 |  | 0.29 |
| N/10 | $SiO_2$ |  | 1.6 |  | 0.6 |  | 1.3 |
| NaOH | CaO |  | 0.16 |  | 0.52 |  | 0.1 |
| N | $SiO_2$ |  | 2.0 |  | 0.65 |  | 1.2 |
| NaOH | CaO |  | 0.5 |  | 2.0 |  | 0.26 |

| Glass No.C/07 | | 179 | | 183 | | 186 | | 199 | |
|---|---|---|---|---|---|---|---|---|---|
|  |  | Mol | Wt.% | Mol | Wt.% | Mol | Wt.% | Mol | Wt.% |
|  | $SiO_2$ | 56 | 53.7 | 58 | 55.0 |  | 58.2 | 54 | 51.4 |
|  | $ZrO_2$ | 7 | 13.75 | 7 | 13.63 |  | 14.0 | 7 | 13.66 |
|  | CaO | 30 | 26.8 | 28 | 24.8 |  | 22.8 | 32 | 28.44 |
|  | MgO | 5 | 3.2 | 5 | 3.2 |  |  | 5 | 3.19 |
|  | SrO |  |  | 2 | 3.3 |  |  | 2 | 3.28 |
|  | BaO |  |  |  |  |  |  |  |  |
|  | $TiO_2$ | 2 | 2.55 |  |  |  |  |  |  |
|  | $Na_2O$ |  |  |  |  |  | 5.0 |  |  |
|  | ZnO |  |  |  |  |  |  |  |  |
| Liquidus Temperature $T_L$ °C | | 1395 | | 1418 | | 1370 | | 1400 | |
| Chemical Durability | | | | | | | | | |
| Reagent | Oxide extracted | | | | | | | | |
|  | $Na_2O$ |  |  |  |  |  | 0.33 |  |  |
| $H_2O$ | $SiO_2$ |  |  |  | 0.25 |  | 0.8 |  | 1.0 |
|  | CaO |  | 1.02 |  | 0.35 |  | 0.42 |  | 0.37 |
| N/10 | $SiO_2$ |  | 1.15 |  | 0.85 |  | 1.2 |  | 0.8 |
| NaOH | CaO |  | 0.25 |  | 0.1 |  | 0.21 |  | 0.2 |
| N | $SiO_2$ |  | 1.3 |  |  |  | 2.0 |  | 0.4 |
| NaOH | CaO |  | 0.95 |  | 0.25 |  | 0.5 |  | 0.25 |

| Glass No.C/07 | | 201 | | 202 | | 204 | | 205 | |
|---|---|---|---|---|---|---|---|---|---|
|  |  | Mol | Wt.% | Mol | Wt.% | Mol | Wt.% | Mol | Wt.% |
|  | $SiO_2$ | 54 | 50.66 | 54 | 52.1 | 56 | 52.93 | 58 | 54.23 |
|  | $ZrO_2$ | 7 | 13.46 | 7 | 13.85 | 9 | 17.44 | 7 | 13.41 |
|  | CaO | 30 | 26.27 | 32 | 28.8 | 30 | 26.47 | 28 | 24.44 |
|  | MgO | 5 | 3.14 | 5 | 3.2 | 5 | 3.17 | 5 | 3.14 |
|  | SrO | 4 | 6.47 |  |  |  |  |  |  |
|  | BaO |  |  |  |  |  |  | 2 | 4.77 |
|  | $TiO_2$ |  |  |  |  |  |  |  |  |
|  | $Na_2O$ |  |  | 2 | 1.99 |  |  |  |  |
|  | ZnO |  |  |  |  |  |  |  |  |
| Liquidus Temperature $T_L$ °C | | 1400 | | 1365 | | 1450 | | 1405 | |
| Chemical Durability | | | | | | | | | |
| Reagent | Oxide extracted | | | | | | | | |
|  | $Na_2O$ |  |  |  | 0.46 |  |  |  |  |
|  | $SiO_2$ |  | 0.3 |  | 0.6 |  | 0.5 |  | 0.3 |
|  | CaO |  | 0.7 |  | 0.37 |  | 0.26 |  | 0.2 |
| $H_2O$ | { SrO | | 0.06 | | | | | | |
|  | BaO |  |  |  |  |  |  |  | 0.25 |
|  | $SiO_2$ |  | 1.3 |  | 1.3 |  | 1.0 |  | 0.95 |
| N/10 | | | | | | | | | |
|  | CaO |  | 0.1 |  | 0.12 |  | 0.39 |  | 0.3 |
|  | MgO |  |  |  |  |  |  |  | 0.05 |
| NaOH | | | | | | | | | |
|  | BaO |  |  |  |  |  |  |  | 0.25 |
|  | $SiO_2$ |  | 1.5 |  | 2.7 |  | 1.8 |  | 1.3 |
| N | | | | | | | | | |
|  | CaO |  | 0.43 |  | 0.49 |  | 0.44 |  | 0.2 |
| NaOH | { SrO | | 0.1 | | | | | | |

TABLE 2-continued

|  |  | | |  | 0.1 |  | 0.05 |
|---|---|---|---|---|---|---|---|
| MgO |  | | |  |  |  |  |
| BaO |  | | |  |  |  | 0.25 |

| Glass No.C/07 | 206 | | 208 | | 209 | | 211 | |
|---|---|---|---|---|---|---|---|---|
|  | Mol | Wt.% | Mol | Wt.% | Mol | Wt.% | Mol | Wt.% |
| SiO$_2$ | 58 | 58.48 |  | 65.0 |  | 65.0 |  | 52.0 |
| ZrO$_2$ | 7 | 13.73 |  | 10.0 |  | 12.0 |  | 18.0 |
| CaO | 28 | 25.0 |  | 20.0 |  | 20.0 |  | 29.0 |
| MgO | 5 | 3.21 |  |  |  |  |  |  |
| SrO |  |  |  |  |  |  |  |  |
| BaO |  |  |  |  |  |  |  |  |
| TiO$_2$ |  |  |  |  |  |  |  |  |
| Na$_2$O |  |  |  | 5.0 |  | 3.0 |  | 1.0 |
| ZnO | 2 | 2.59 |  |  |  |  |  |  |
| Liquidus Temperature T$_L$ °C |  | 1410 |  |  |  |  |  |  |

Chemical Durability

| Reagent | Oxide extracted | | | | | | | |
|---|---|---|---|---|---|---|---|---|
|  | Na$_2$O |  |  |  | 0.22 |  | 0.135 |  |
|  | SiO$_2$ |  | 0.4 |  | 0.7 |  | 0.25 |  |
| H$_2$O | CaO |  | 0.2 |  | 0.19 |  | 0.135 |  |
|  | BaO |  |  |  |  |  |  |  |
|  | ZnO |  | 0.5 |  |  |  |  |  |
|  | SiO$_2$ |  | 0.5 |  | 1.15 |  | 1.05 |  |
| N/10 | CaO |  | 0.15 |  | 0.1 |  | 0.1 |  |
|  | MgO |  |  |  |  |  |  |  |
| NaOH |  |  |  |  |  |  |  |  |
|  | BaO |  |  |  |  |  |  |  |
|  | ZnO |  | 0.1 |  |  |  |  |  |
|  | SiO$_2$ |  | 2.85 |  | 2.25 |  | 2.25 |  |
| N | CaO |  | 0.3 |  | 0.28 |  | 0.25 |  |
|  | MgO |  |  |  |  |  |  |  |
| NaOH |  |  |  |  |  |  |  |  |
|  | BaO |  |  |  |  |  |  |  |
|  | ZnO |  | 0.15 |  |  |  |  |  |

| Glass No.C/07 | 212 | | 213 | | 214 | | 215 | | 216 | |
|---|---|---|---|---|---|---|---|---|---|---|
|  | Mol | Wt.% | Mol | Wt.% | Mol | Wt.% | Mol | Wt.% | Mol | Wt.% |
| SiO$_2$ |  | 51.0 |  | 50.0 |  | 52.0 |  | 54.0 |  | 55.0 |
| ZrO$_2$ |  | 19.0 |  | 20.0 |  | 14.0 |  | 13.5 |  | 6.0 |
| CaO |  | 29.0 |  | 29.0 |  | 24.0 |  | 21.5 |  | 39.0 |
| MgO |  |  |  |  |  | 10.0 |  | 3.0 |  |  |
| SrO |  |  |  |  |  |  |  |  |  |  |
| BaO |  |  |  |  |  |  |  | 8.0 |  |  |
| TiO$_2$ |  |  |  |  |  |  |  |  |  |  |
| Na$_2$O |  | 1.0 |  | 1.0 |  |  |  |  |  |  |
| ZnO |  |  |  |  |  |  |  |  |  |  |

Liquidus Temperature T$_L$ °C

Chemical Durability

| Reagent | Oxide extracted | | | | | | | | | |
|---|---|---|---|---|---|---|---|---|---|---|
|  | Na$_2$O |  | 0.13 |  |  |  |  |  |  |  |  |
|  | SiO$_2$ |  | 0.4 |  |  |  | 0.25 |  | 0.35 |  | 1.6 |
| H$_2$O | CaO |  | 0.225 |  |  |  | 0.14 |  | 0.15 |  | 0.9 |
|  | BaO |  |  |  |  |  |  |  |  |  |  |
|  | ZnO |  |  |  |  |  |  |  |  |  |  |
|  | SiO$_2$ |  | 0.7 |  |  |  | 0.65 |  | 0.85 |  | 0.9 |
| N/10 |  |  |  |  |  |  |  |  |  |  |  |
|  | CaO |  | 0.13 |  |  |  | 0.12 |  | 0.15 |  | 0.15 |
| NaOH |  |  |  |  |  |  |  |  |  |  |  |
|  | MgO |  |  |  |  |  |  |  |  |  |  |
|  | BaO |  |  |  |  |  |  |  | 0.05 |  |  |
|  | ZnO |  |  |  |  |  |  |  |  |  |  |
|  | SiO$_2$ |  | 1.65 |  |  |  | 1.55 |  | 1.9 |  | 2.6 |
| N |  |  |  |  |  |  |  |  |  |  |  |
|  | CaO |  | 0.35 |  |  |  | 0.34 |  | 0.3 |  | 0.6 |
|  | MgO |  |  |  |  |  |  |  |  |  |  |
| NaOH |  |  |  |  |  |  |  |  |  |  |  |
|  | BaO |  |  |  |  |  |  |  | 0.1 |  |  |
|  | ZnO |  |  |  |  |  |  |  |  |  |  |

The liquidus temperatures of glasses C/07/208 to 216 inclusive were not precisely measured, but it was ascertained that they all fell within the range from 1400° C to 1500° C. The chemical durability of glasses C/07/211 and 213 was not measured because these glasses are very similar to glass 212, differing only in the content of ZrO$_2$ with consequential adjustment to the SiO$_2$ content, and they can consequently be confidently predicted to behave similar chemical durability, 211 being slightly less good due to its lower ZrO$_2$ and 213 being slightly better due to its higher ZrO$_2$ content.

When using the maximum permissible amount of SiO$_2$ (65 weight %) a proportion of up to 5 weight % Na$_2$O may be included, as in glasses C/07/208 and 209, to improve the drawing characteristics of the glass and thereby facilitate the formation of fibres. These glasses also contain the minimum permissible amount of RO (20 weight%) in the form of CaO. In general, the amount of RO increases as the amount of SiO$_2$ is reduced. As shown by the foregoing Examples, CaO may vary between 20 and 45% and up to 10% of the RO may consist of MgO, as in glass C/07/214. Up to 10% of the RO can be BaO, up to 8% of the RO can be SrO, and up to 5% of the RO can be ZnO, if desired. With MgO or SrO present, a slight lowering of the liquids temperature can be achieved, which is beneficial for formation of glass fibres. A small amount of $TiO_2$ can also be included, as in glass C/07/179, to produce a similar lowering of the liquidus temperature, but $TiO_2$ also tends to reduce the alkali resistance so it can only be used to a limited extent, i.e. up to 5 weight %. $Al_2O_3$ produces similar effects.

$B_2O_3$ or $F_2$ could also be included in amounts of up to 5 weight % to assist melting. $Fe_2O_3$ may be present in the customary small amounts (up to 0.5 weight %) which result from the normal impurities in raw materials.

We claim:

1. An alkali-resistant glass composition consisting essentially of, in weight percentages:

| | |
|---|---|
| $SiO_2$ | 45 to 65% |
| $ZrO_2$ | 6 to 20% |
| RO | 20 to 45% | the total of $SiO_2$ + $ZrO_2$ + RO being not less than 94% by weight of the glass, where RO represents at least one divalent oxide of the group consisting of CaO, MgO, SrO, BaO and ZnO, the amount of said divalent oxide or oxides lying within the ranges, in weight percentages: CaO 20 to 45%, MgO 0 to 10%; SrO 0 to 8%; BaO 0 to 10% and ZnO 0 to 5% and wherein if components other than $SiO_2$, $ZrO_2$ and RO are included in said glass composition, each such component does not exceed 5% by weight of the composition.

2. A glass composition according to claim 1, wherein said glass composition includes at least one component selected from the group of $TiO_2$, $Al_2O_3$, $B_2O_3$, $Fe_2O_3$, $F_2$ and $R_2O$, where $R_2O$ represents $K_2O$, $Na_2O$ or $Li_2O$.

3. A glass composition according to claim 2, wherein the amount of $R_2O$ does not exceed 3% by weight of said composition.

4. A glass composition according to claim 2, wherein $SiO_2$ = 65% and CaO = 20% and said composition also contains 5% $Na_2O$ by weight.

5. An alkali-resistant glass composition consisting essentially of, in weight percentages:

| | |
|---|---|
| $SiO_2$ | 45 to 65% |
| $ZrO_2$ | 6 to 20% |
| RO | 20 to 45% |
| $TiO_2$ | 0 to 5% |
| $Al_2O_3$ | 0 to 5% |
| $B_2O_3$ | 0 to 5% |
| $Fe_2O_3$ | 0 to 5% |
| $F_2$ | 0 to 5% |

$R_2O$ ($K_2O$, $Na_2O$ or $Li_2O$) 0 to 5% the total of $SiO_2$ + $ZrO_2$ + RO being from 94% to 100% by weight of the glass, where RO represents the total of one or more divalent oxides of the group consisting of CaO, MgO, SrO, BaO and ZnO, the amount of said divalent oxide or oxides lying within the ranges, in weight percentages:

| | |
|---|---|
| CaO | 20 to 45% |
| MgO | 0 to 10% |
| SrO | 0 to 8% |
| BaO | 0 to 10% |
| ZnO | 0 to 5% |

* * * * *